United States Patent
O'Gorman et al.

(10) Patent No.: US 7,443,142 B2
(45) Date of Patent: Oct. 28, 2008

(54) ACTIVE RECTIFICATION OF ALTERNATOR OUTPUT WITHOUT USING A POSITION SENSOR

(75) Inventors: Patrick A. O'Gorman, Grayslake, IL (US); Dennis L. Stephens, Barrington, IL (US)

(73) Assignee: Temic Automotive of North America, Inc., Deer Park, IL (US)

( * ) Notice: Subject to any disclaimer, the term of this patent is extended or adjusted under 35 U.S.C. 154(b) by 209 days.

(21) Appl. No.: 11/313,358

(22) Filed: Dec. 21, 2005

(65) Prior Publication Data

US 2007/0176579 A1 Aug. 2, 2007

(51) Int. Cl.
H02P 11/00 (2006.01)
H02P 9/00 (2006.01)
H02H 7/06 (2006.01)

(52) U.S. Cl. .................................... 322/24; 322/28
(58) Field of Classification Search .............. 322/24, 322/28, 29, 44; 318/807
See application file for complete search history.

(56) References Cited

U.S. PATENT DOCUMENTS

| | | | | |
|---|---|---|---|---|
| 3,805,144 A | * | 4/1974 | McSparran | 322/25 |
| 5,701,064 A | * | 12/1997 | Horst et al. | 318/701 |
| 5,793,167 A | | 8/1998 | Liang | |
| 6,175,217 B1 | * | 1/2001 | Da Ponte et al. | 322/19 |
| 6,850,426 B2 | * | 2/2005 | Kojori et al. | 363/123 |
| 6,853,523 B1 | * | 2/2005 | Schwarz et al. | 361/23 |
| 6,989,655 B2 | * | 1/2006 | Eguchi et al. | 322/23 |
| 7,042,229 B2 | * | 5/2006 | Lee et al. | 324/551 |
| 7,239,113 B2 | * | 7/2007 | Johnson | 322/58 |
| 7,271,570 B2 | * | 9/2007 | O'Gorman et al. | 322/22 |
| 2002/0176266 A1 | | 11/2002 | Perreault | |
| 2003/0075997 A1 | | 4/2003 | Keim | |
| 2003/0107349 A1 | * | 6/2003 | Haydock et al. | 322/28 |
| 2004/0232538 A1 | | 11/2004 | Linke | |
| 2005/0087990 A1 | | 4/2005 | Henry | |
| 2007/0029799 A1 | * | 2/2007 | Shimizu et al. | 290/1 A |

FOREIGN PATENT DOCUMENTS

JP          2005328635 A     * 11/2005

* cited by examiner

Primary Examiner—Julio C. Gonzalez

(57) ABSTRACT

Disclosed herein is an automotive electrical system including a FET based rectifier and method of controlling the FET based rectifier without using either an alternator shaft position sensor or current sensors on each phase of the alternator output to control the switching of the FETs. In accordance with the teachings herein, the voltage and current on the DC bus of the automotive electrical system are sensed and switching of the FETs is controlled by a microcontroller that determines the appropriate switching times based on these sensed parameters.

5 Claims, 9 Drawing Sheets

ACTIVE RECTIFICATION OF ALTERNATOR OUTPUT WITHOUT USING A POSITION SENSOR

CROSS REFERENCE TO RELATED APPLICATIONS

This application is related to application Ser. No. 11/313,467, having the same title and inventors as the present application and filed concurrently herewith, and now issued as U.S. Pat. No. 7,271,570.

FIELD OF THE INVENTION

This invention relates to automotive electrical systems. More particularly, the invention relates to increasing the amount of power that can be drawn from a standard automotive alternator.

BACKGROUND

The 12 volt systems used in today's automobiles are required to supply ever increasing currents as the load on the system continues to increase. This increase is due to a combination of increasing numbers of electronic devices, such as communication, entertainment, and telematics systems, as well as the proliferation of electrically powered auxiliary systems to replace traditional hydraulically or mechanically powered systems (e.g., electric power steering). To reduce the amount of current required to supply these higher loads, it has been proposed that automobiles should adopt 42 volt electrical systems. The automotive industry, however, has been reluctant to transition to 42 volt electrical systems because of increased costs. Consequently, there is a strong demand to improve the performance of 12 volt systems, thereby allowing higher electrical loads to operate effectively with conventional vehicle electrical systems.

One limiting factor on automotive electrical system performance is the voltage drop that occurs across the rectifier bank when the alternating current (AC) voltage generated by the alternator is converted to a direct current (DC) voltage. Diode rectification is the predominant method of AC/DC conversion. The forward voltage drop of the diodes (typically about 0.7 volts) is a significant proportion of the battery voltage. Consequently, it has a major impact on system efficiency and also reduces the current drawn from the alternator. Diodes having a lower voltage drop or higher system voltages mitigate this problem but neither solution appears likely to reach commercialization in the near future. The efficiency of automotive electrical systems, however, may be increased by using field effect transistors (FETs) to actively rectify alternator output, rather than diodes currently used for passive rectification. The voltage drop across a switched-on FET (as low as 0.1 volt) is substantially lower than the drop across a forward biased diode.

One problem with FET-based rectifiers is that of determining when to turn the switches on and off. Historically, most techniques have used an alternator shaft position sensor to determine when the FETs should switch. Unfortunately, alternator manufacturers generally do not provide such a sensor as part of a standard alternator, and custom parts include attendant higher costs. Other prior art techniques have used an estimation technique that requires three current sensors, one on each AC phase. For cost reasons, the use of multiple AC current sensors is not feasible in automotive electrical system applications.

In other applications where FETs are used to rectify AC electricity, such as single phase and three phase AC power supplies, the source voltage tends to be very stiff, i.e. the source voltage is not affected by the amount of current drawn therefrom. Because inductors are typically included in such systems to reduce current harmonics, the voltages across these inductors are readily available for switching control. Unfortunately, in an automotive alternator, the inherent inductance in series with each winding is significant, resulting in a substantially less stiff voltage source. As a result, the terminal voltage is distorted considerably as current is drawn from the alternator, and control techniques from the AC power supply arts are not easily applicable.

Thus, what is needed in the art is a method for properly controlling a FET-based rectifier in an automotive application without the use of a position sensor or the use of AC current sensors on each alternator phase.

BRIEF DESCRIPTION OF THE DRAWINGS

Embodiments of the inventive aspects of this disclosure will be best understood with reference to the following detailed description, when read in conjunction with the accompanying drawings, in which.

DETAILED DESCRIPTION

The present invention is directed to an automotive electrical system including a FET-based rectifier and method of controlling the FET based rectifier without using either an alternator position sensor or current sensors on each phase of the alternator output to control the switching of the FETs. In accordance with the teachings of the present invention, the voltage and current on the DC bus of the automotive electrical system are sensed and switching of the FETs is controlled by a microcontroller that determines the appropriate switching times based on these sensed parameters.

Figure 1:
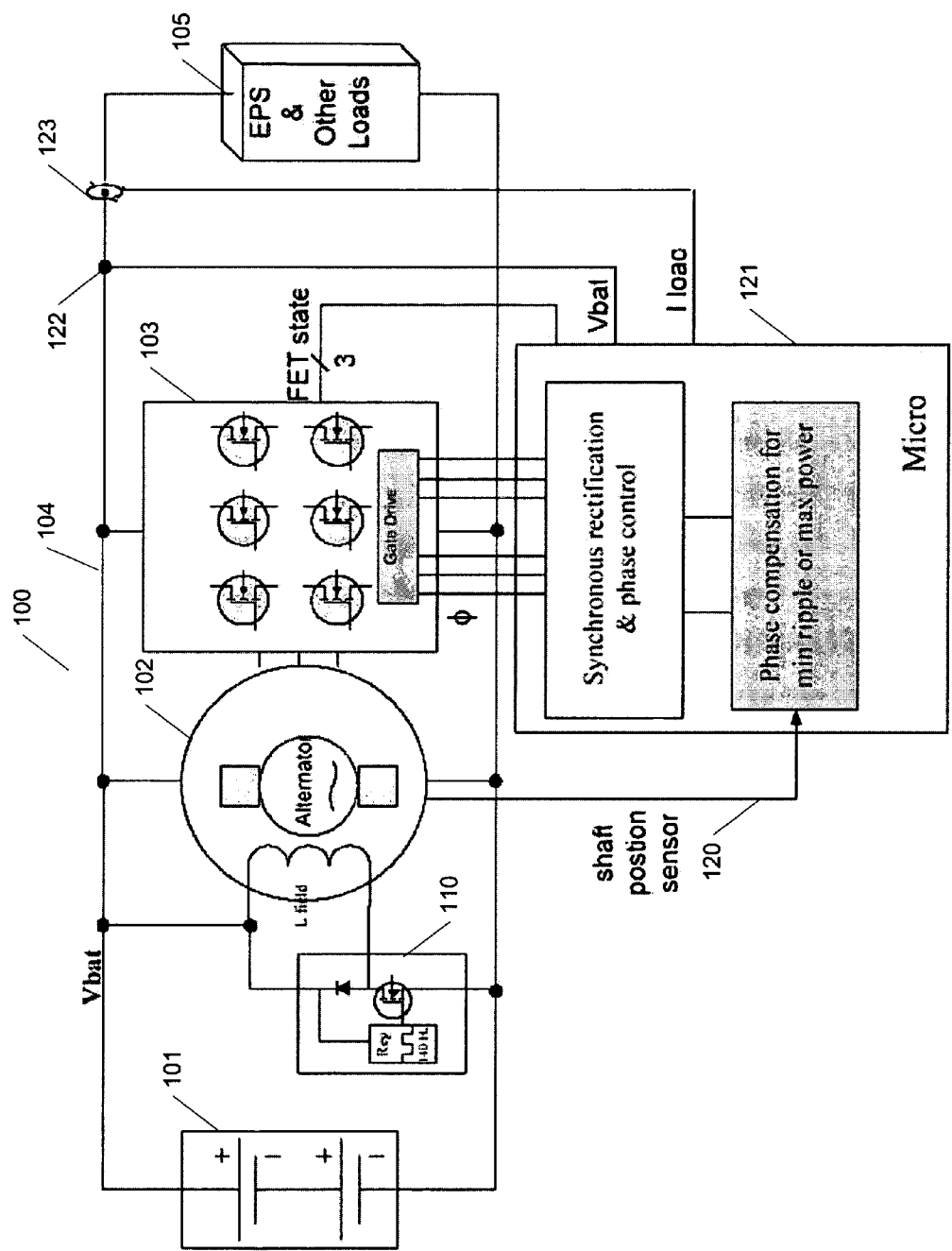
FIG. 1 illustrates an automotive electrical system.

Understanding of the invention will be facilitated by reference to FIG. 1, an automotive electrical power system 100 is shown. Automotive electrical system 100 has two power sources, a battery 101 and an alternator 102. In many automotive applications, the battery 101 is a conventional lead acid battery, although various other battery types may also be used. During normal vehicle operation, the battery 101 does not supply energy to a bus 104 and the loads connected thereto. The electrical energy required for normal vehicle operation is provided by the alternator 102, assuming that the capacity of the alternator 102 is sufficient to provide the required power. If this power cannot be supplied by the alternator 102, power is drawn from the battery 101. Additionally, the battery 101 is available to provide power to the various electrical loads when the vehicle is not in operation. When the alternator 102 generates more power than needed by the loads connected to the bus 104, the excess may be used to recharge the battery 101.

Battery charging current may be left uncontrolled, as is typical, or a voltage regulator 110 may be configured to regulate the charge current and voltage supplied to the battery 101. In normal operation, however, the voltage regulator 110 is operative to keep the voltage of the bus 104 at a nearly constant value. This is necessary because the output voltage of the alternator 102 varies with engine speed and the electrical load connected to the bus 104. Design of various voltage regulator circuits is well known to those skilled in the art, and thus is not addressed in detail here. In general, the regulator controls the bus voltage by controlling the field current to the alternator.

The alternator 102 is typically a wound field alternator of a type known to those skilled in the art, such as a Lundell alternator, however, other alternators may be used. Current flows from the alternator 102 to the bus 104 through a rectifier bank 103. The alternator 102 and the rectifier bank 103 may be either single phase or multi-phase. Typically, the rectifier bank 103 comprises a plurality of diodes. In this case, however, a plurality of FETs is used, in essence replacing diodes with a switch/diode combination. With this change from diode to FET, the switching instant is now controllable when the appropriate gating signal is applied to the FET gate. As noted above, the use of FETs as opposed to diodes for rectification poses a control difficulty. Whereas diodes are self-commutated devices, and thus do not require any control to dictate turn on and turn off instants, FETs must be switched on and off at the proper time. For the reasons noted above, position sensors or other conventional techniques of rotor position sensing are undesirable in the automotive alternator application.

Illustrated in FIG. 1 is an alternator shaft position sensor 120, which connects to a microcontroller 121 for switching control. By incorporating the teachings herein, a standard alternator, i.e., one without a position sensor, may be used by using two different techniques to determine the appropriate switching time for the FETs. Both sensing techniques require sensing of the current on the DC bus 104, using a current sensor 123. Additionally, voltage of the DC bus 104 is sensed by a voltage sensor 122 because the ultimate goal of the rectifier switching control is to regulate the bus voltage to an almost constant voltage. The sense signals are coupled to the microcontroller 121.

In the case of either of the two switching control techniques, the FETs are switched at the same electrical frequency as the alternator, but the phase at which they are switched relative to the alternator shaft position (and thus back EMF) may be varied. This ability to control the phase of FET switching permits the rectifier to increase or decrease the average output current above the current available from a diode rectifier operating under the same conditions. An additional benefit of the active rectifier is that the DC bus voltage may be controlled with a much faster response time because the FET switching can respond more quickly than the field current of the alternator.

Figure 2:
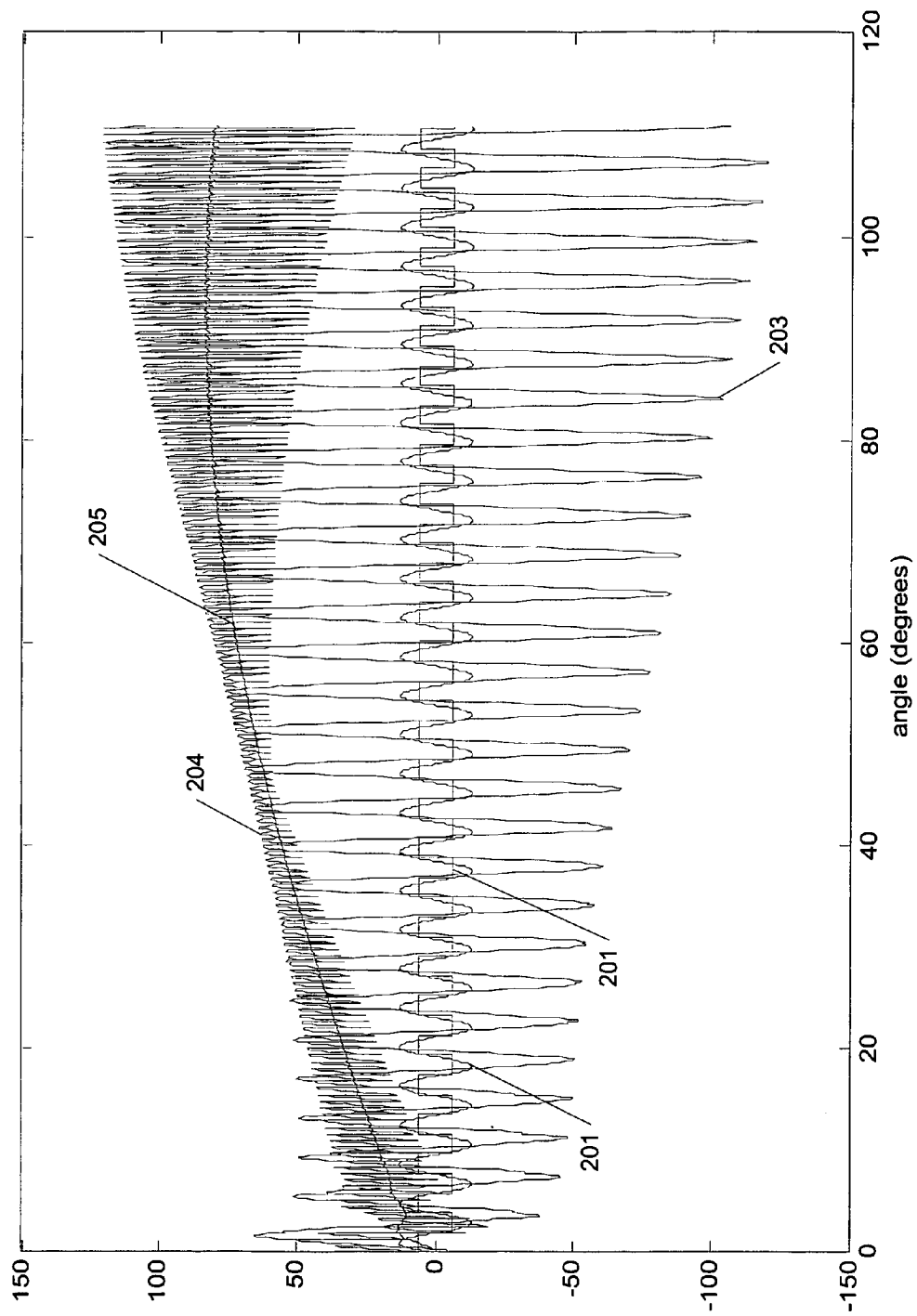
FIG. 2 illustrates characteristic waveforms for an automotive electrical system employing certain teachings of the present disclosure.

Understanding of the control techniques may be had with reference to FIG. 2, which illustrates simulated waveforms for a system employing the control techniques of the present invention. In the simulation of FIG. 2, the field current and rotational speed of the alternator are held constant, so that the change in DC bus voltage and current are a function only of the switching of the rectifier FETs.

There are five waveforms shown in FIG. 2, two voltages and three currents. Sinusoidal waveform 201 is back EMF of one alternator output phase. One skilled in the art will understand that this waveform is not measurable when current is drawn from the alternator, and that it is a function of the shaft position of the alternator. Square wave 202 is the applied voltage of one of the FETs, in this case the FET corresponding to the positive rail of the rectifier for phase A. The transitions of this waveform correspond to the switching on and off of the rectifier, and for purposes of the discussion herein is used as a proxy for rectifier switching. It will be appreciated by those skilled in the art that the applied voltage of phase A 202 is shown as a voltage relative to the alternator neutral point. In this case, when the upper FET in phase A is gated on, the voltage applied to the phase is half battery voltage. When the lower FET in phase A is gated on, the voltage applied to phase A is negative half battery voltage. At a phase angle of zero degrees (0°), the back EMF 201 and alternator switching 202 are in phase. As the angle increases, the phase of alternator switching increasingly lags the alternator back EMF.

The third waveform in FIG. 2 is increasing sinusoid 203, which is the phase current of the alternator. The fourth waveform is the instantaneous DC bus current 204, which is the combined rectified current of all three phases of the alternator. The fifth waveform is the average DC bus current 205, which is the instantaneous DC bus current 204 with the ripple filtered out. Behavior of these currents should be noted as the phase between the alternator back EMF 201 and the rectifier switching 202 increases. Specifically, as the phase angle between the back EMF 201 and the rectifier applied voltage 202 increases gradually along the phase angle axis, the phase current 203 also increases. During this same time, the ripple current decreases until it reaches a minimum at approximately 47°, and begins increasing again. The average current 205 also increases continuously as the phase angle increases. The average current increases until the phase between the back EMF and rectifier switching is approximately 90°. (Note that the exact value depends on factors such as winding resistance. Ninety degrees is the theoretical phase that produces maximum current.)

Figure 3:
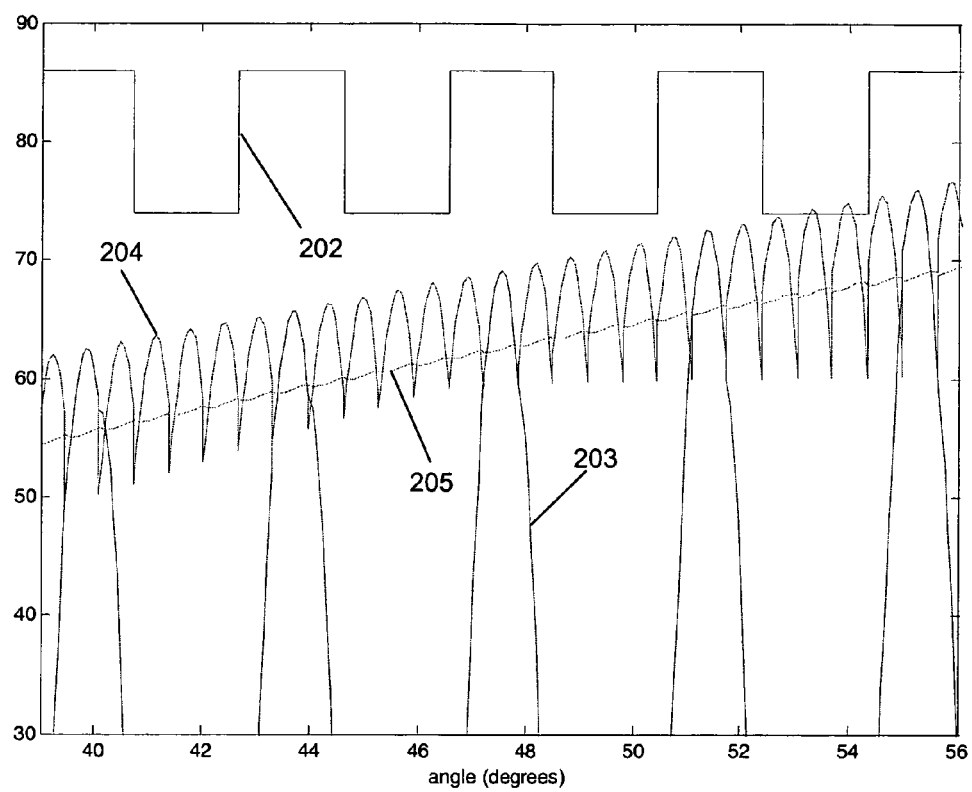
FIG. 3 is an enlargement of a portion of FIG. 2 illustrating characteristic waveforms for an automotive electrical system employing certain teachings of the present disclosure.

The above-described relationship between the phase of rectifier switching and DC bus current may be more clearly seen in FIG. 3, which is an enlargement of portions of FIG. 2 in the vicinity of the minimum ripple point at approximately 47°. The point where the ripple of instantaneous DC bus current 204 is minimized corresponds to a FET switching phase that corresponds to switching at the same time at which diodes switch. A FET rectifier operating at this point is said to be operating in the diode mode. The FET rectifier is able to decrease the phase of switching from this point to reduce the average phase current, at the expense of increased ripple. Alternatively, the FET rectifier can increase the phase further to increase the average phase current, also at the expense of increased ripple. This allows the rectifier to control the DC bus current, and thus the voltage of the DC bus.

Figure 5A:
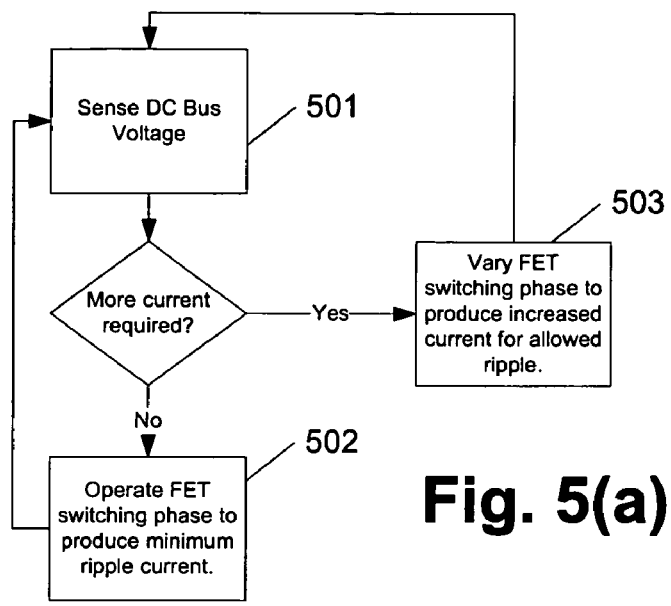
FIGS. 5(a)-5(c) are flow diagrams illustrating the techniques of rectifier control in accordance with the teachings of the present invention.

Using the rectifier to control the DC bus voltage has advantages over the conventional voltage regulator, principally in that the rectifier can respond much faster to load changes. Such a control technique is illustrated in FIG. 5(a), described further below. The microcontroller 121 continuously senses the voltage of the DC bus 104 as monitored by the current sensor 122, which is indicated in step 501. If the voltage is in its normal range, i.e., when high currents are not required, the FETs should be switched to operate at the minimum ripple point (step 502), which most closely replicates diode operation. When additional current is needed (e.g., because of a high current load being switched on), which is detected by a decrease in the DC bus voltage, the FET switching phase may be increased to produce this additional current (step 503). This assumes that the increased ripple current can be tolerated, which generally is the case.

For normal operation, two methods may be used to determine when the current ripple is minimized, i.e., when the system is operating in the diode mode. Each method may also be used to determine where the system is operating relative to diode mode, i.e., is the system operating in the region to the left in FIGS. 2 and 3 where the phase angle is decreased beyond diode mode, or is the system operating in the region to the right in FIGS. 2 and 3, where the phase angle is increased beyond diode mode. One method relies on average current and average current ripple on the DC link, while a second method relies on sampling the DC link current at specific intervals in the cycle. In either case, the DC link current (i.e., the current on DC bus 104) is sensed by current sensor 123.

With regard to the first method, it can be seen from FIG. 2, that if the phase angle for FET firing is increased beyond the minimum ripple point (e.g., phase angles greater than 47° in FIG. 2), both the average current and ripple increase. Conversely, if the firing angle is decreased (e.g., phase angles less than 47° in FIG. 2) the average current is reduced while the ripple current increases. Thus, the first method relies on a comparison of average current value and ripple current value obtained immediately before and after a small perturbation of the FET firing phase. Any of the known techniques for obtaining the ripple current may be used (e.g., AC coupling, amplifying, and filtering).

Figure 6:
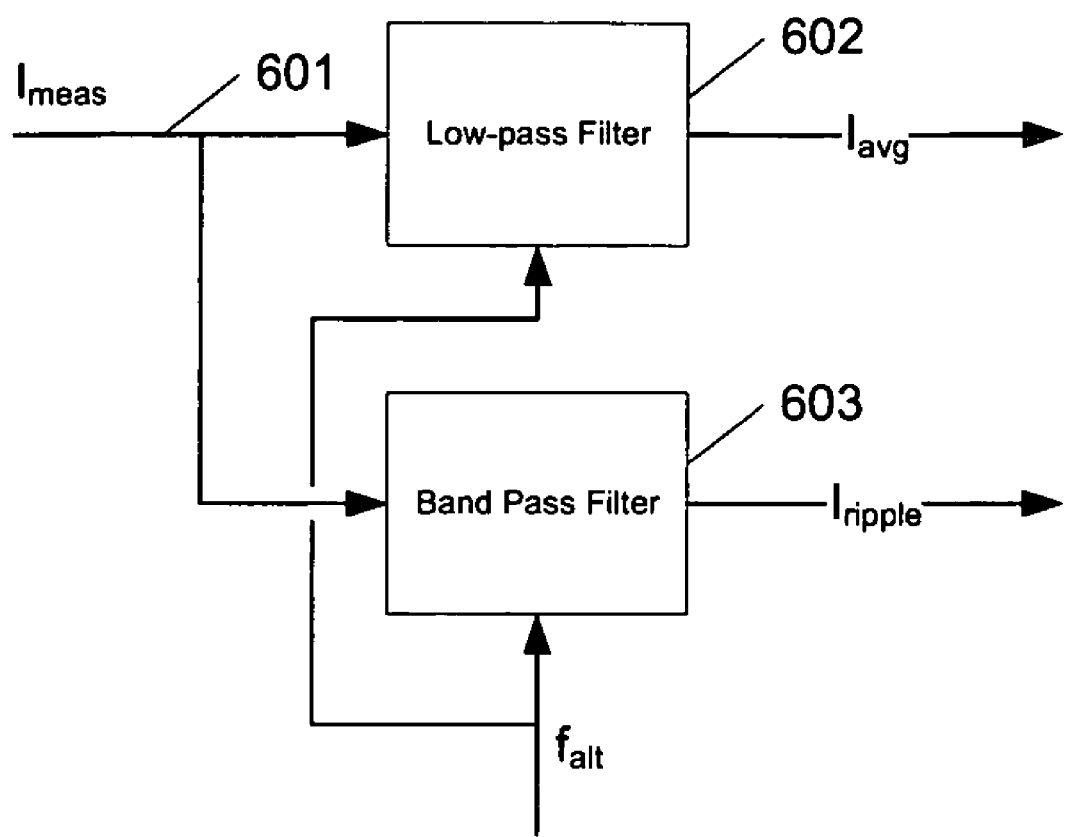
FIG. 6 is a block diagram of a filtering arrangement that may be used in conjunction with the present invention for obtaining ripple current and average current on the DC bus of an electrical system.

One circuit for obtaining the average and ripple current is illustrated by block diagram in FIG. 6. The measured current $I_{meas}$, which comes from current sensor 123, is input into a low pass filter 602 and a band pass filter 603. The output of the low pass filter is the average current ($I_{avg}$). The output of the band pass filter 603 is the ripple current ($I_{ripple}$).

The cutoff frequency of low pass filter 602 is a function of the alternator frequency, and may be selected by one skilled in the art to produce reliable average currents for the entire range of alternator operating frequencies. Alternatively, the low pass filter 602 may be a tracking type filter (as shown) that varies its cutoff frequency as a function of the alternator frequency. (Note that low pass filter 602 receives the alternator frequency ($f_{alt}$) as an input.) Band pass filter 603 is a tracking filter that passes signals having a frequency of six times the alternator frequency. (Note that band pass filter 603 also receives as an input the alternator frequency ($f_{alt}$).) Construction of both filter types is known to those skilled in the art, and thus details are not reproduced here. The alternator frequency ($f_{alt}$) is obtained from the FET switching frequency if the FETs are active; otherwise, it is obtained from the alternator line-line voltage using a squaring circuit and a timer in the microcontroller.

Figure 5C:
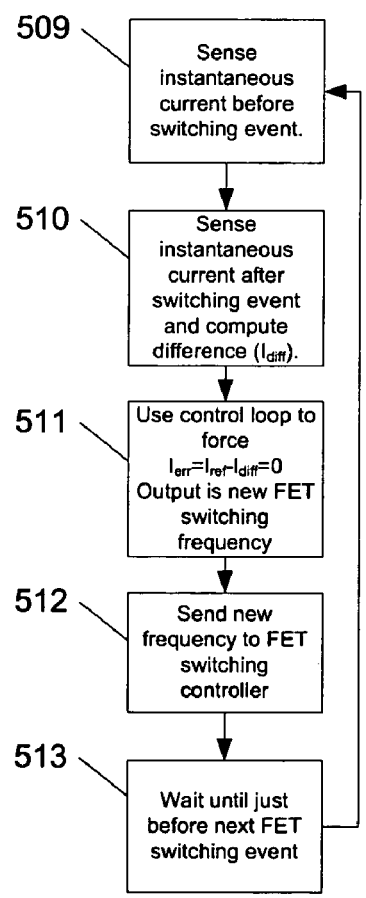
Figure 5B:
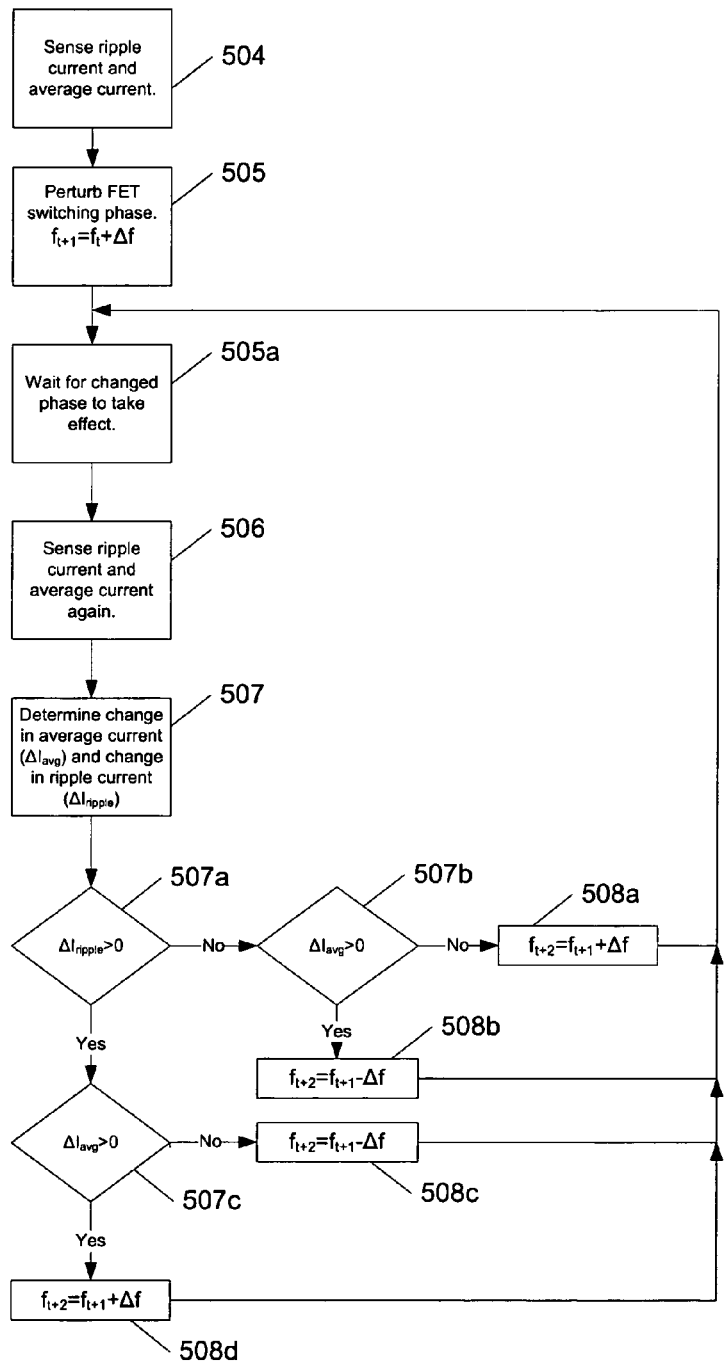

Specific details of the control method based on average and ripple current may be understood by reference to FIG. 5b. The ripple current and average current are sensed in step 504. The FET switching phase is then slightly perturbed. Those skilled in the art will note that this is done by perturbing the switching frequency of the FETs. Specifically, an increase in frequency corresponds to a decrease in phase and vice versa. In one embodiment, the perturbation ($\Delta f$) is one percent of the initial frequency, although other fractions of the initial frequency may be used. After a suitable time delay for the change to take effect, the ripple current and average current are again obtained. In one embodiment, the amount of time waited may be varied as a function of the alternator frequency. A higher alternator frequency necessitates a shorter wait time and vice versa. That said, a delay on the order of 10 cycles of the alternator voltage waveform suffices for most applications, though other values of wait time may be chosen depending on the alternator parameters (e.g., alternator time constants).

The average currents and ripple currents obtained immediately before and immediately after the perturbation of FET switching phase are used to generate difference values $\Delta I_{avg}$ and $\Delta I_{ripple}$, where the change is computed by subtracting the first (pre-perturbation) value from the second (post-perturbation) value. In step 507a, it is determined whether the ripple current increased as a result of the perturbation, ie., $\Delta I_{ripple} > 0$. If the ripple current decreased it is determined whether the average current also increased (step 507b). If both the ripple current and average current decreased, the FET switching phase (frequency) is again perturbed (step 508a) in the same direction as in step 505. After a suitable delay (step 505a) ripple current and average current are again measured (step 506) and the process repeats. Alternatively, if the ripple current decreased and the average current increased, the FET switching phase (frequency) is perturbed (step 508b) in the opposite direction of the perturbation performed in step 505, and, after a suitable delay (step 505a) the currents are again measured (step 506) and the process repeats. If it is determined that the ripple current increased (step 507a) and the average current also increased (step 507c), the FET switching phase (frequency) is again perturbed (step 508d) in the same direction as in step 505, and, after a suitable delay to allow the change to take effect (step 505), new ripple current and average current values are sensed (step 506) and the process repeats. Finally, if it is determined that the ripple current increased (step 507a) and the average current decreased (step 507c) the FET switching phase (frequency) is perturbed in the opposite direction (step 508c) of the perturbation performed in step 505, and after a suitable delay (step 505a) new values of average current and ripple current are sensed (step 506) and the process repeats. The average current must be checked for an increase or a decrease for both $\Delta I_{ripple} > 0$ and $\Delta I_{ripple} < 0$ because a load change may occur before the post-perturbation value is read, resulting in an unexpected deviation of $\Delta I_{ripple}$ or $\Delta I_{avg}$.

As will be appreciated by one skilled in the art, the algorithm described above assumes that tracking to the minimum ripple point (i.e., diode mode) is desired. However, any point may be selected as the operating point and the difference in ripple currents used to track to this point. This searcher algorithm is similar to those used for peak power tracking in solar cells. Such a searcher algorithm has the advantage that it does not make any assumptions regarding the battery state of charge, battery condition (i.e., new or old), load current waveform (and the impact of the load current wave form on battery voltage), ambient temperature, etc.

The phase angle of the FETs is thus continuously perturbed, or dithered, so that changes in output current and ripple current are continuously occurring. If the ripple current and average current values both increase, the phase is delayed too much. Conversely, if the ripple current increases but the average current decreases, the phase has been decreased too much.

Figure 4A:
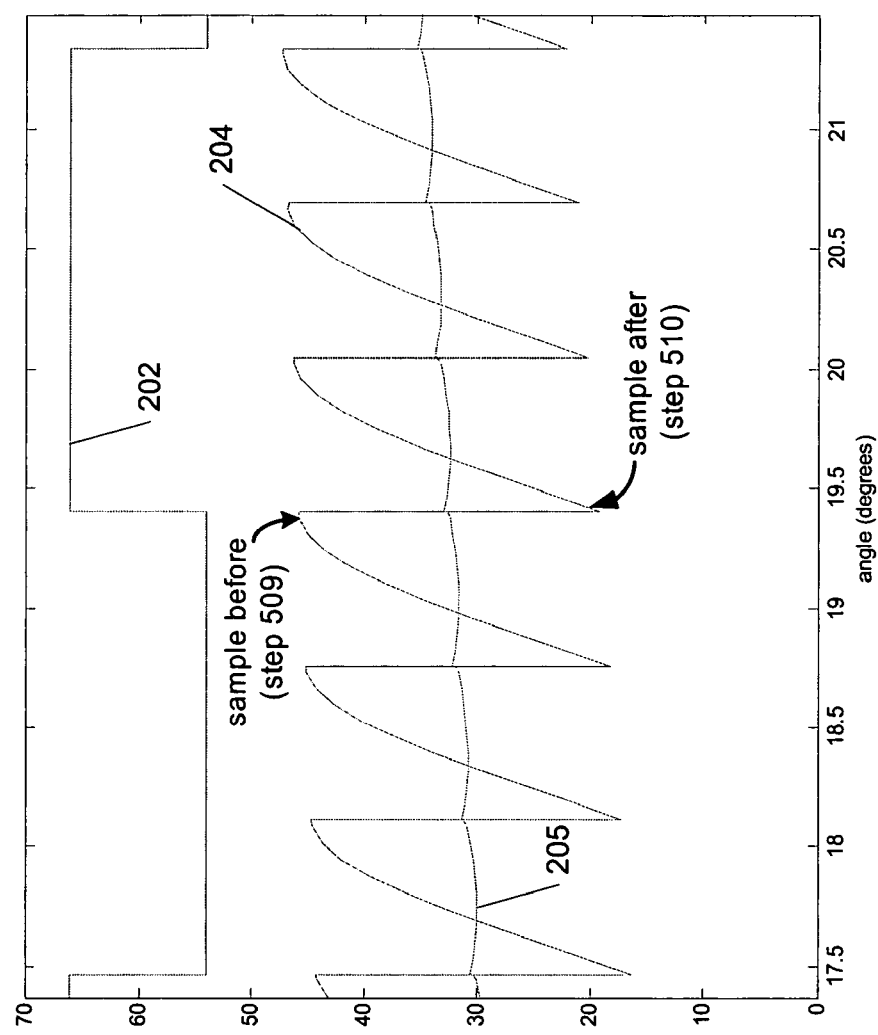
FIGS. 4(a)-4(c) illustrate additional characteristic waveforms for an automotive electrical system employing certain teachings of the present disclosure.
Figure 4B:
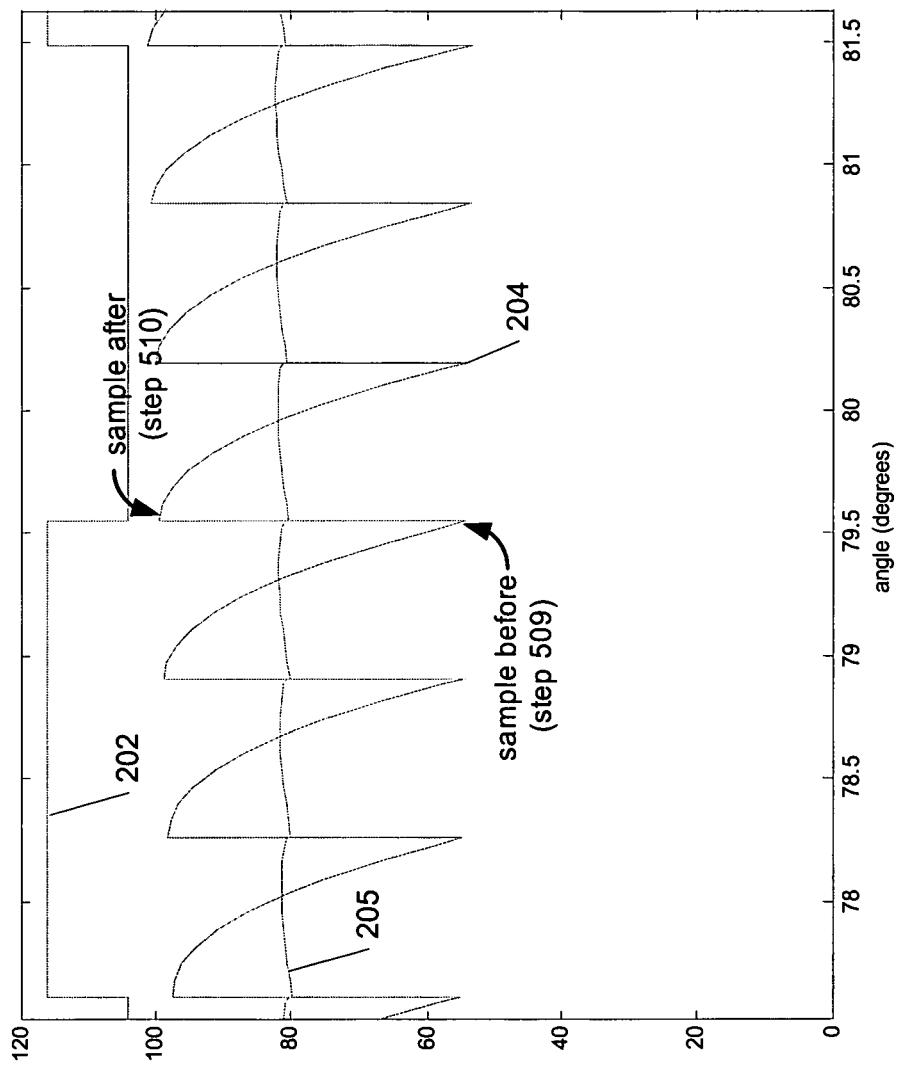

A second method for minimizing ripple current relies on the change in DC link current waveform on either side of the minimum ripple point (62 ms in this example). As can be seen in FIG. 3, when the system is operating outside the diode mode, there is a discontinuity in the DC bus current as a result of the switching event. This discontinuity can be used by the controller to determine whether it is operating in the diode mode, and, if not, whether the phase should be decreased or increased to return to diode mode. FIGS. 4(a) and 4(b) better illustrate these discontinuities in the instantaneous phase current 204. It should be noted that the idealized simulation waveforms of FIGS. 4(a) and 4(b) do not account for inductance in series with the bus, so current changes are instantaneous.

In FIG. 4(a), the relevant waveforms are shown for phase angles less than 47°, i.e., when the phase of the switching signal has not been increased all the way to the minimum ripple point. As can be seen, the instantaneous value of the DC link current 204 just after a FET switches (illustrated by switching signal 202) is lower than the instantaneous value of the DC link current just before a FET switched (i.e., a falling discontinuity). This indicates that the phase of FET switching should be further increased to return to the diode mode.

The situation is reversed for phase angles greater than 47°, i.e., when the phase of the switching signal has been increased beyond the minimum ripple point, illustrated in FIG. 4(b). The instantaneous value of the DC link current just after a FET switches (illustrated by the transition of switching signal 202) is greater than just before it switched (i.e., a rising discontinuity). This indicates that the phase of FET switching should be decreased to return to the diode mode.

Figure 4C:
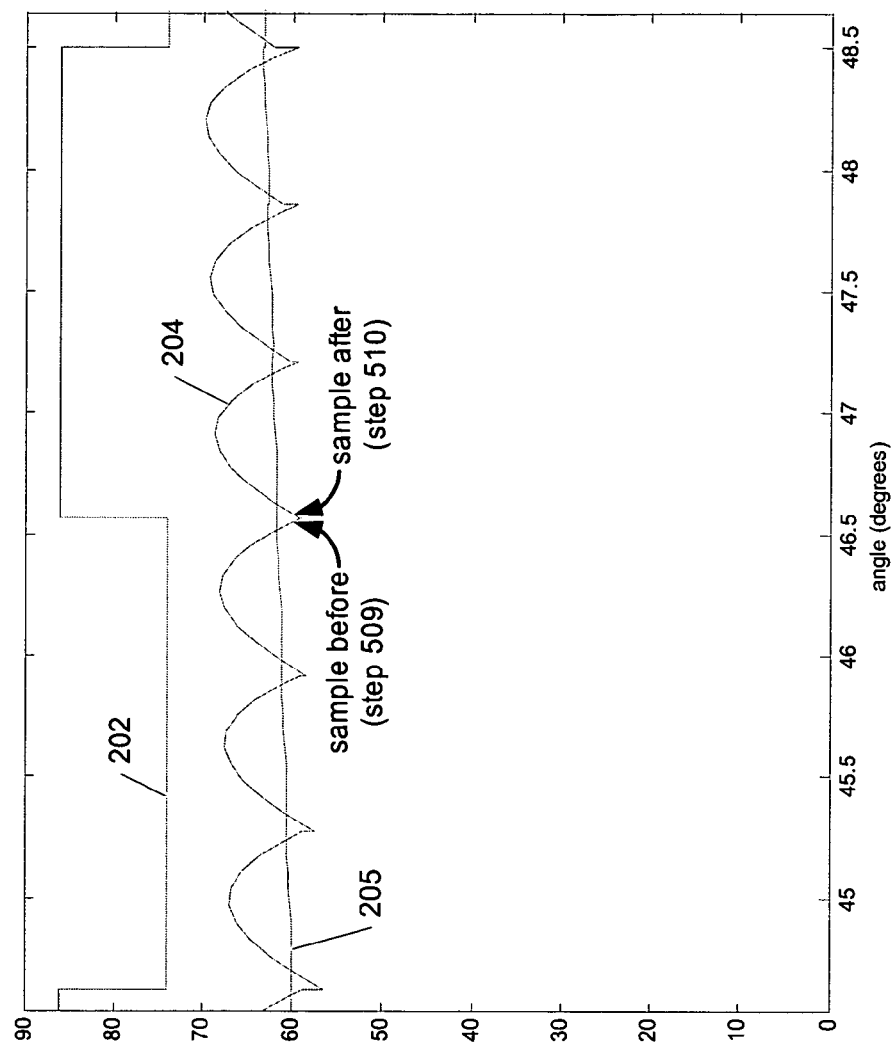

Obviously, if there is no current discontinuity, the current immediately before and immediately after the switching event is continuous and the system is operating in the diode mode. The diode mode of operation, i.e., the minimum ripple point, is illustrated in FIG. 4(c). As can be seen, there is no discontinuity in the DC link current 204 associated with the change of FET state (illustrated by the transition of switching signal 202). Also, it can be seen that the ripple is substantially less than that illustrated in either FIG. 4(a) or 4(b).

A control method based on these observations is illustrated in FIG. 5(c). The instantaneous DC link current is sampled just before (step 509) and just after (step 510) a FET switching event. These two values are compared in step 511. Specifically, a difference signal ($I_{diff}$) is computed as the difference between the current after the switching event and the current before the switching event. The difference signal is subtracted from a reference current ($I_{ref}$) to generate an error signal ($I_{err}$). The error signal $I_{err}$ is used in conjunction with a control loop to control the FET switching phase (frequency). In one embodiment, the control loop may be a proportional-integral (PI) control loop, although other control loops—proportional or proportional-integral-derivative (PID)—could also be used. Construction of such control loops and the use of loops other than PI or PID is well known to those skilled in the art, and thus details are not reproduced here.

In most cases, $I_{ref}=0$, so the diode mode of operation is obtained. However, if an output current in excess of that delivered in diode mode is desired, $I_{ref}>0$ is commanded. This forces the FET firing angle to increase beyond 47 degrees, thereby resulting in an increase in $I_{avg}$ to the desired value. Conversely, if a reduction in average output current is desired, Iref<0 is commanded, thereby forcing the angle to reduce below 47 degrees. In all cases, the PI loop, or any other loop used to regulate $I_{err}$, is preferably designed to force $I_{err}=0$ in the long term, even though short term deviations from 0 will exist.

Operation of the control loop is basically as follows: If the instantaneous DC link current immediately prior to the switching event is greater than the instantaneous DC link current immediately after the switching event (i.e., the current did not increase), the phase of the switching signal may be increased to produce more output current. This corresponds to a decrease in the FET switching frequency. Conversely, if the instantaneous DC link current just before the switching event is less than the instantaneous DC link current subsequent to the switching event (i.e., the current did increase), the switching signal phase has been increased beyond the minimum ripple point and should be decreased to stay at the minimum ripple point. Thus the FET switching frequency is increased.

In either case, the new FET switching frequency is sent to the switching controller (step 512). After a suitable delay (step 513) the process resumes with the next switching event (return to step 509).

Both of the aforementioned methods for minimizing ripple current could be used together, with one method performing a redundant verification of the other method. Alternatively, the chosen method may change depending on alternator speed. As alternator speed increases, sampling of the DC link current may be limited by the processor speed, in which case the averaging method would be the preferred method.

The techniques described herein permits operation of an alternator and FET based rectifier in a more efficient manner, while simultaneously allowing the alternator output power to be increased beyond that available when using a diode based rectifier when the additional power is needed. This additional power is made available because the losses across the rectifying elements (FETs versus diodes) are substantially reduced. A further advantage of the present invention is that the need an alternator shaft position sensor to control FET switching is eliminated, allowing a standard, unmodified alternator to be used. Yet another advantage is that the control methods described herein are self-compensating in that they do not depend on particular machine parameters, and thus it is not necessary to have the controller account for variations due to manufacturing tolerances, age, wear, etc.

It should be understood that the inventive concepts disclosed herein are capable of many modifications, combinations and sub-combinations. To the extent such permutations fall within the scope of the appended claims and their equivalents, they are intended to be covered by this patent.

What is claimed is:

1. An automotive electrical system comprising:
a DC bus;
a voltage sensor configured to sense a voltage of the DC bus;
a current sensor configured to sense a current of the DC bus;
an alternator;
an active rectifier coupling the alternator to the DC bus, the alternator comprising a plurality of FETs; and
a microcontroller coupled to the voltage sensor, the current sensor, and the active rectifier, the microcontroller configured to control switching of the plurality of FETs without reference to a shaft position of the alternator by analyzing the voltage and current of the DC bus wherein the microcontroller switches the plurality of FETs to minimize ripple current on the DC bus by executing instructions corresponding to the method comprising:
sensing a first instantaneous current on the DC bus to which the output of the rectifier is connected immediately prior to a switching event;
sensing a second instantaneous current on the DC bus to which the output of the rectifier is connected immediately after the switching event;
comparing the sensed first instantaneous current to the sensed second instantaneous current to determine whether to increase or decrease the phase of FET switching;
decreasing the phase of FET switching if the second instantaneous current is greater than the first instantaneous current; and increasing the phase of FET switching if the second instantaneous current is less than the first instantaneous current.

2. An automotive electrical system comprising:
a DC bus;
a voltage sensor configured to sense a voltage of the DC bus;
a current sensor configured to sense a current of the DC bus;
an alternator;
an active rectifier coupling the alternator to the DC bus, the alternator comprising a plurality of FETs; and
a microcontroller coupled to the voltage sensor, the current sensor, and the active rectifier, the microcontroller configured to control switching of the plurality of FETs without reference to a shaft position of the alternator by analyzing the voltage and current of the DC bus wherein the microcontroller switches the plurality of FETs to minimize ripple current on the DC bus by executing instructions corresponding to the method comprising:
at low alternator speeds:
sensing a first instantaneous current on the DC bus to which the output of the rectifier is connected immediately prior to a switching event;
sensing a second instantaneous current on the DC bus to which the output of the rectifier is connected immediately after the switching event; and
comparing the sensed first instantaneous current to the sensed second instantaneous current to determine whether to increase or decrease the phase of FET switching; and
at high alternator speeds:
sensing a first ripple current and first average current on a DC bus to which the output of the rectifier is connected;
perturbing a phase of FET switching relative to an AC voltage generated by the alternator in a first direction;
sensing a second ripple current and a second average current on the DC bus after perturbing the phase of FET switching; and
comparing the first ripple current and first average current to the second ripple current and the second average current to determine whether the phase of FET switching should be again perturbed in the first direction or should be perturbed in a second direction opposite the first direction.

3. The automotive electrical system of claim 2 wherein the microcontroller switches the plurality of FETs to increase available current within a predetermined limit for ripple current when additional current is required.

4. The automotive electrical system of claim 3 wherein the microcontroller determines that additional current is required by reference to the voltage of the DC bus.

5. The automotive electrical system of claim 2 wherein the microcontroller switches the plurality of FETs to minimize ripple current on the DC bus by executing instructions corresponding to the method further comprising:
at low alternator speeds:
decreasing the phase of FET switching if the second instantaneous current is greater than the first instantaneous current; and
increasing the phase of FET switching if the second instantaneous current is less than the first instantaneous current; and
at high alternator speeds:
perturbing the phase of FET switching in the second direction if the second average current is less than the first average current;
perturbing the phase of FET switching in the second direction if the second average current is greater than the first average current and the second ripple current is greater than the first ripple current;
perturbing the phase of FET switching again in the first direction if the second average current is greater than the first average current and the second ripple current is less than the first ripple current.

* * * * *